March 3, 1959  B. T. HENSGEN  2,875,708
ICE CREAM SANDWICH MACHINE
Filed July 19, 1954  4 Sheets-Sheet 1

INVENTOR.
BERNARD T. HENSGEN
BY R. G. Story
ATTORNEY

March 3, 1959    B. T. HENSGEN    2,875,708
ICE CREAM SANDWICH MACHINE
Filed July 19, 1954    4 Sheets-Sheet 2
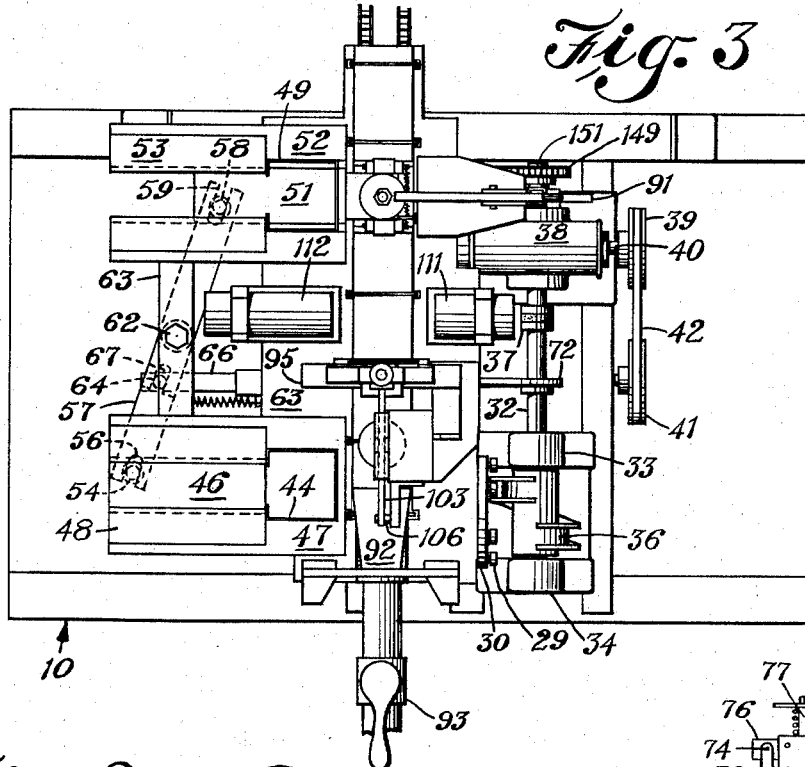
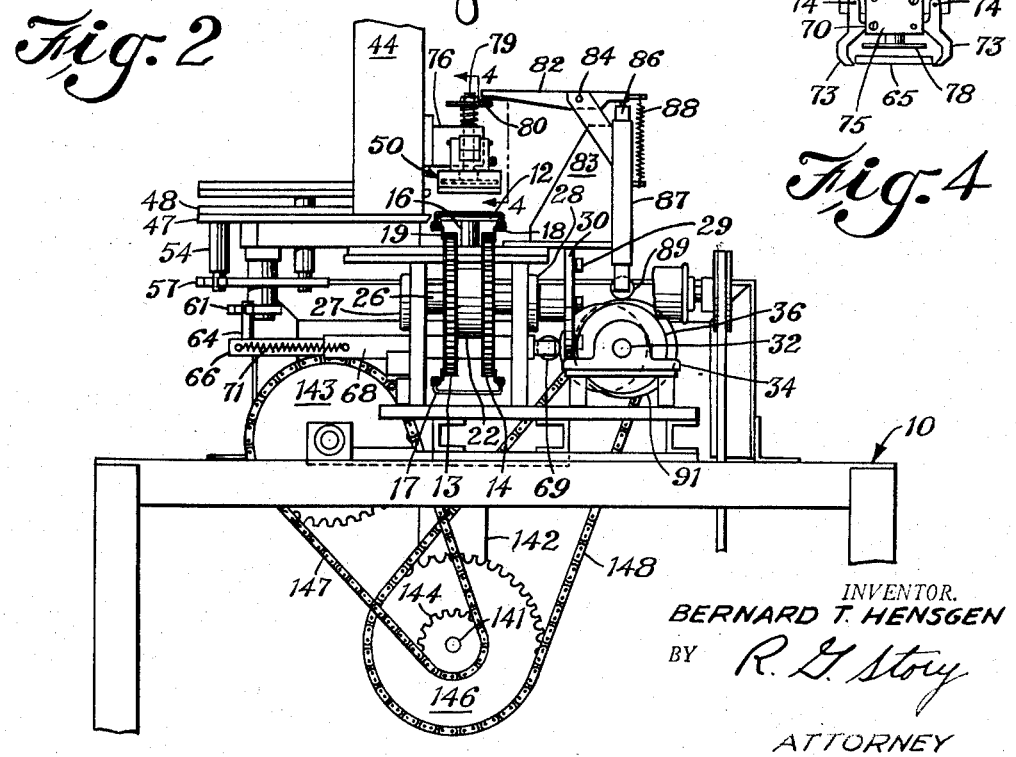
INVENTOR.
BERNARD T. HENSGEN
BY R. G. Story
ATTORNEY

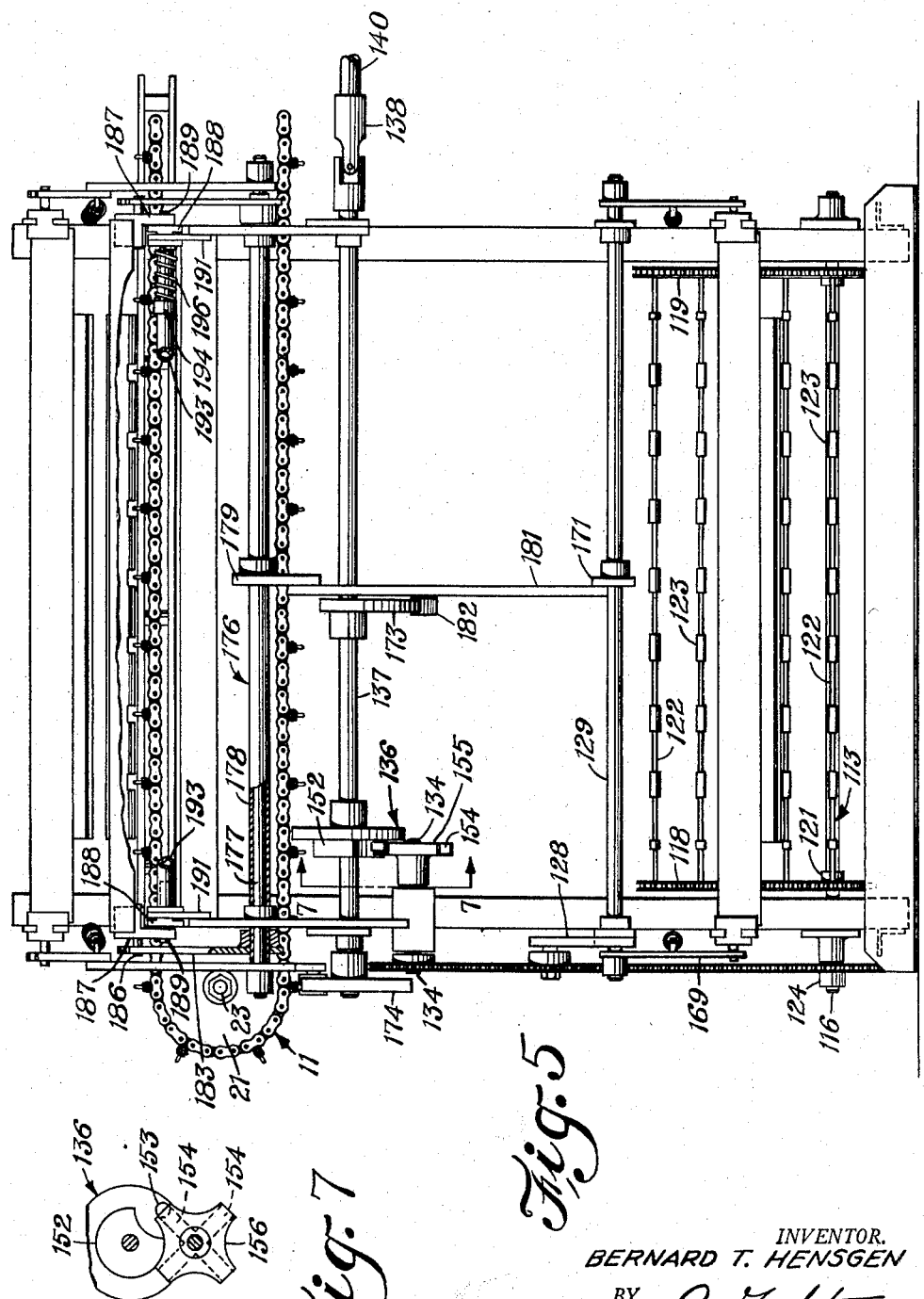

March 3, 1959 B. T. HENSGEN 2,875,708
ICE CREAM SANDWICH MACHINE

Filed July 19, 1954 4 Sheets-Sheet 4

INVENTOR.
BERNARD T. HENSGEN
BY R. G. Story
ATTORNEY

United States Patent Office

2,875,708
Patented Mar. 3, 1959

2,875,708

ICE CREAM SANDWICH MACHINE

Bernard T. Hensgen, Chicago, Ill., assignor to Swift & Company, Chicago, Ill., a corporation of Illinois Application July 19, 1954, Serial No. 444,018

4 Claims. (Cl. 107—1)

The present invention relates to a method and apparatus for use in preparing food products such as ice cream sandwiches.

As generally practiced today the manufacture of ice cream sandwiches (or similar products) is substantially a hand operation or at least involves a very substantial amount of hand operations. A principal object of the present invention is to provide a method and apparatus wherein the operations can be performed entirely by machine with the only labor required being to supervise the operations of the machine and to keep it supplied with the materials necessary for operation. This not only greatly cuts the cost of manufacture but tends to be a much more sanitary operation.

We are aware that some proposals have been made in the past to do at least parts of the operation of making such products by machines. In general, to the extent that such proposals related to performing at least a substantial part of the operation by machine, it contemplated the forming of solidified blocks of ice cream that would then be placed between cookies or the like. This involves the forming and freezing of the ice cream before any actual forming of the sandwich occurs. This tends to be slow, requires a substantial investment in molds, freezer space and, where necessary, cutting machines for the ice cream. We reduce the capital investment and operations, a notable object, by forming the sandwich with the ice cream in a plastic condition with a quick, sharp, freeze to set up the ice cream whereupon the sandwich is ready for shipment or storage. We have devised a method and apparatus for achieving this wherein the plastic ice cream is flowed out on a cookie by moving the two at a common rate of speed, the ice cream is cut off, a second cookie is placed over the ice cream, and the sandwich is tamped and frozen.

The term ice cream as used herein is intended to include other plastic products having similar properties although made from somewhat different ingredients, as for example Mellorine or other frozen desserts. The subcombination of the forming machine alone could be used for making sandwiches with fillers that did not require freezing such as comminuted meats and sandwich spreads.

Other objects and advantages will be apparent from the following description and drawings in which:

Figure 2 is a front elevation of the embodiment of Figure 1 with the gear reducer and part of the drive belt not shown and with the extruder nozzle, cut-off mechanism, and electric eye removed for clarity;

Figure 3 is a plan view of the embodiment of Figure 1;

Figure 4 is an auxiliary view taken at the line 4—4 in Figure 2 showing the top wafer dispenser;

Figure 5 is a side elevation of an embodiment of the freezing section of the invention with the insulated covering and the refrigeration equipment removed;

Figure 7 is a partial section taken at line 7—7 in Figure 5 showing the intermittent motion driving means.

Figure 1:
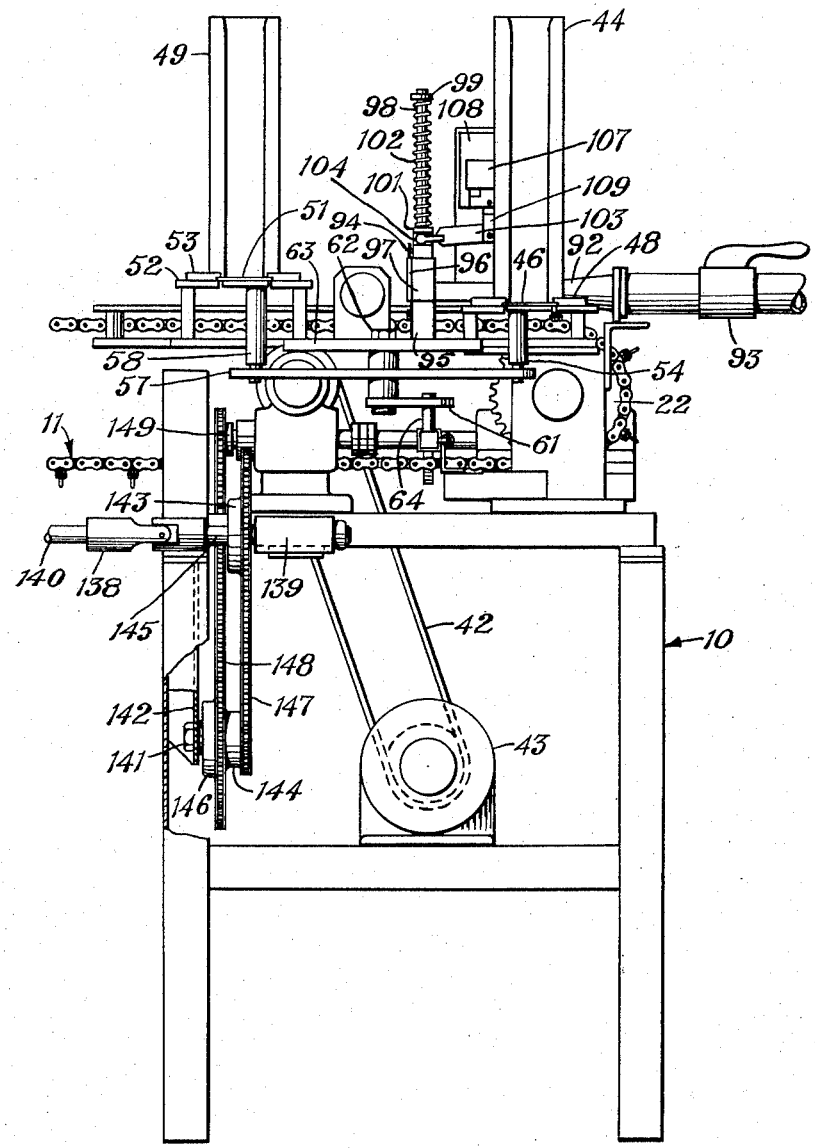
Figure 1 is a side elevation of an embodiment of the forming section of an embodiment of the invention.

The device comprises a frame, generally 10, on which is mounted a carrier conveyor, generally 11. Conveyor 11 is comprised of a plate 12 positioned immediately above the top course of a pair of chains 13 and 14 and supported by a plurality of spacers 16 which are mounted in turn on frame 10. The pair of chains are divided into equally spaced segments by wires 17 positioned to ride across the top of plate 12 as best seen in Figure 2. The wires 17 are secured by means of nuts 18 to angle-clips 19 which are welded to chains 13 and 14.

Chains 13 and 14 rotate on a pair of double sprockets 21 and 22. Sprocket 21 (Figure 6) is carried on a stub shaft 23 which is fastened to plate 24, a part of frame 10. Sprocket 22 (Figure 2) is fixed to a shaft 26, journaled in bearings 27 and 28. A series of cam followers 29 are mounted on follower plate 30 which is fixed to one end of shaft 26. A cam shaft 32 (Figure 3), supported by bearings 33 and 34, carries a cam 36 which as it rotates sequentially engages cam followers 29 and thereby rotates shaft 26 a fraction of a revolution. Shaft 32 is connected by means of a flexible coupling 37 to one end of the output shaft 151 of gear reducer 38. Mounted on the input shaft 40 of gear reducer 38 is a pulley 39 which is connected to second pulley 41 by a belt 42. Pulley 41 is driven by a motor 43. From the foregoing, it is apparent that the conveyor 11 will be advanced through the device in intermittent steps. These steps are adjusted to correspond to the distance between successive wires 17.

The bottom wafers for the ice cream sandwiches are fed onto conveyor 11 from a chute 44. Chute 44 is open at the top so that wafers may be easily fed thereinto and is closed at the bottom by a frame plate 47. A feed plate 46 is slidably mounted over plate 47 and guided for reciprocating horizontal motion by ways 48. A second chute 49 is provided to feed the top wafer onto the ice cream sandwich at the proper time. Chute 49 is also open at the top and closed at the bottom by a frame plate 52. A feed plate 51 is slidably mounted over frame plate 52 and guided for reciprocating horizontal movement by ways 53. A pin 54 projects downward from plate 46 and is engaged by a slot 56 in one end of a pivot bar 57. Similarly, a pin 58 projects downward from plate 51 and is engaged by a slot 59 in the opposite end of bar 57. Welded integrally with bar 57 is a pivot arm 61. Bar 57 with its arm 61 is pivotally mounted on a hex headed pin 62 which is suspended from bar 63, a part of frame 10. A pin 64 projects upward from a cam rod 66 and engages a slot 67 in arm 61. Cam rod 66 is mounted for reciprocal horizontal motion in a guide bearing 68 and is provided at the end opposite pin 64 with a cam follower 69. Spring 71 urges the cam rod against a cam 72 mounted on cam shaft 32.

It should be noted that, whereas plate 46 is positioned at an elevation only slightly above the level of the conveyor 11, plate 51 is positioned to deposit wafers into a wafer dispenser, generally 50, spaced at a distance slightly greater than the thickness of an ice cream sandwich above carrier conveyor 11. The wafer dispenser 50, illustrated in Figure 4, comprises a pair of jaws 73 pivotally mounted on pins 74. Pins 74 are pressed into a bracket 76 which is fastened to wafer chute 49. The jaws 73 are held in the position shown in Figure 4 by stops 70 bearing against a plate 75 and are balanced so that only slight pressure is required to move the jaws outward from each other. A shouldered rod 77 is mounted to reciprocate in bracket 76. A tamper plate 78 is fixed to the lower end of rod 77 and a pressure plate 80 is shouldered at the upper end by a nut 79. A spring 81 surrounds rod 77 and urges it upward against rocker arm 82. Rocker arm 82 is pivotally mounted on an upstanding portion 83 of the frame 10 by means of a pin 84. A rod 86 passes through a sleeve bearing 87. Rocker arm 82 is urged against the rod 86 by a spring 88. A cam follower 89 attached to the lower end of rod 86 rides on a cam 91. Cam 91 is fastened to and rotates with cam shaft 32.

Ice cream is fed into an extrusion nozzle 92 from a suitable source of supply which is not shown on the drawings and the flow may be controlled by a valve 93. A valve plate 94 (Figure 1) rides in a pair of ways 96 which are mounted on guide block 97. Guide block 97 is welded to the end of nozzle 92 and also to a pair of brackets 95 which rest on frame plate 63. The plate 94 is positioned to open and close the end of the nozzle and thereby regulate the flow of ice cream and also act as a cut-off for the individual blocks of ice cream for each sandwich. Projecting upward from guide block 97 is a rod 98 having at its upper end a collar 99. A sleeve 101, integral with plate 94, surrounds rod 98. Spaced between the collar 99 and sleeve 101 is a spring 102 urging the plate 94 downward to close the mouth of the nozzle. A clevis 103 engages a pair of slots 104 in sleeve 101 and at its opposite end is pivotally mounted to the frame 10 by means of a pin 106. A solenoid coil 107 is mounted on an upright member 108 of the frame 10 while the solenoid plunger 109 is attached to clevis 103. When the solenoid is energized, the plunger will be drawn upward into the coil thereby raising the clevis and opening the mouth of the nozzle to permit ice cream to flow outward. An electric eye 111 and a source of light 112 are positioned on opposite sides of the upper course of conveyor 11 so that a beam of light from the source to the eye will be intercepted by objects moving along the conveyor.

The electric eye 111 is connected through a suitable amplifier to a source of electric power and solenoid coil 107 is such a manner that light impinging on the eye will deenergize the coil and the absence of light on the eye 111 will energize the coil 107. Any suitable circuit may be used for this purpose such as the "Basic Thyratron Circuit for Single Unit Phototube Relay" illustrated and described at the top of page 187 of the book "Handbook of Industrial Electronic Circuits" by Markus and Zeluff published by McGraw-Hill Book Company, Inc. in 1948, the disclosure of which is included herein by reference.

In operation, the wafers are fed into position during the dwell portion of the conveyor cycle. Cam 72 causes pivot bar 57 to oscillate about the pin 62 (see Figure 3). When plate 46 is in the position shown in the drawing, a wafer will drop onto plate 47. As plate 46 moves forward, the wafer will be pushed off of plate 47 and onto plate 12 between a pair of wires 17. Similarly, when pivot bar 57 oscillates to its opposite position, a wafer 65 will be pushed from plate 52 onto the jaws 73 as shown in Figure 4. Assuming that a lower wafer and an ice cream block are positioned to receive the top wafer, cam 91 begins to raise rod 86. Rod 86 pivots the bar 82 in a counterclockwise direction as seen in Figure 2 about pin 84 thereby forcing the pressure plate 80, rod 77, and tamper plate 78 downward. When the tamper plate strikes the wafer 65, the pivotable jaws swing apart to permit the wafer to drop onto the block of ice cream. The tamper continues downward to press the wafer firmly onto the ice cream and insure good adhesion.

The rate of flow of the ice cream is controlled manually by the valve 93, but having been once set for a particular run, generally does not have to be readjusted. The gate 96, the electric eye 111, and the source of light 112 form a control means for regulating the flow of ice cream. When the beam is impinging on the electric eye 111, the gate will be held closed by spring 102. When the beam is intercepted, the coil 107 will be energized, plunger 109 will be pulled upward lifting with it the clevis 103 and thereby raising gate 96. At the beginning of a cycle, as the conveyor 11 starts its motion the front of a previously formed sandwich will intercept the beam of light and the gate will open to permit ice cream to flow. The leading edge of the flowing ice cream, traveling just above the leading edge of a lower wafer, will begin to drop due to its weight until it touches and is supported by the wafer. When the trailing edge of the previously formed sandwich passes beyond the source of light the beam will once again impinge on the electric eye. This will cause the coil 107 to be de-energized and the gate to close under the urging of spring 102. The gate will cut off the ice cream block being formed and also prevent further flow of ice cream. The conveyor 11 advances a slight distance further and then comes to the dwell portion of its cycle during which time the wafers will be positioned as previously explained.

Figure 6:
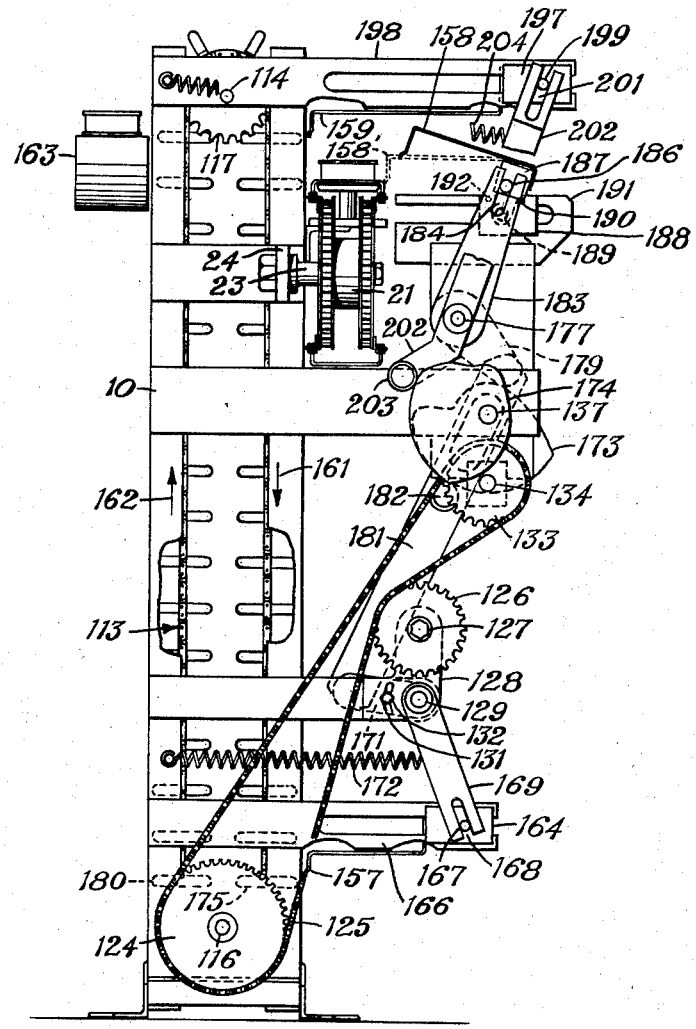
Figure 6 is an end elevation of the embodiment of Figure 5.

After the sandwiches have been formed, they are carried by conveyor 11 into the freezing section of the device shown in Figures 5, 6, and 7. A vertically disposed flight conveyor, generally 113, is supported on frame 10. An upper shaft 114 and a lower shaft 116 are suitably journaled in frame 10. A pair of sprockets 117 are fixed to shaft 114 and are connected by chains 118 and 119 to a second pair of sprockets 121 fixed to shaft 116 to provide two generally vertical runs to the endless conveyor. Joining chains 118 and 119 at regularly spaced intervals are a series of rods 122, welded integral with the chain so as to be held in a fixed angular position during the travel of the chains. A series of sheet metal flights 123 are welded to rods 122 in such a manner as to be in a horizontal position while traversing the vertical runs of the endless conveyor. A sprocket 124 is attached to one end of shaft 116 and is connected by chain 125 to sprocket 133 which is mounted on shaft 134. An adjustable chain tightener is provided comprising an idler sprocket 126 mounted on a stub shaft 127 which is fixed in bracket 128. Bracket 128 is rotatably mounted on shaft 129 which is journaled in frame 10. Adjustment is obtained by means of an arcuate slot 131 in bracket 128 and a locking stud 132 which is threaded into frame 10.

Intermittent motion is imparted to the flight conveyor 113 by means of a geneva drive, generally 136, through a continuously rotating shaft 137. A pair of universal couplings 138 (Figure 5 and Figure 1) and a shaft 140 connect shaft 137 with a shaft 145 (Figure 1) journaled in bearing block 139. A stub shaft 141 is mounted on a leg 142 of the frame 10. A sprocket 143 is fixed to shaft 145 and sprockets 144 and 146 are attached to shaft 141. A chain 147 connects sprockets 143 and 144. Sprocket 146 is connected by a chain 148 to a sprocket 149 which is mounted on an output shaft 151 of speed reducer 38.

The geneva drive 136 is shown more particularly in Figures 5 and 7. A driving wheel 152 is driven by the continuously rotating shaft 137. A pin 153, fixed to wheel 152, with each revolution of wheel 152 sequentially engages a series of four slots 154 in a wheel 156. This results in a rotational movement of 90° of wheel 156 before the pin disengages the slot. Wheel 156 is fixed to shaft 134 and its intermittent motion is transmitted therethrough to sprocket 133 and thence to conveyor 113.

Three pushers 157, 158, and 159 are provided. Pusher 157 transfers sandwiches from the descending flights across to the ascending flights. The directions of movement of the flights are shown by the arrows 161 and 162. Pusher 158 transfers sandwiches from conveyor 11 onto the descending flights. Pusher 159 transfers sandwiches from the ascending flights onto a packing conveyor 163 which carries the sandwiches to the wrapping and packing stations.

Pusher 157 is fixed to a slide block 164 slidably mounted on a slotted bracket 166. A pin 167 projecting from block 164 is engaged in a slot 168 in an arm 169. The arm 169 and an arm 171 are mounted to oscillate with shaft 129 and arm 169 is urged toward conveyor 113 by a spring 172. Two cams, 173 and 174, are mounted on shaft 137. A double shaft assembly, generally 176, is provided comprising an inner shaft 177 and an outer hollow shaft 178. These are best seen in Figure 5. Mounted to rotate with outer shaft 178 is a rocker arm 179. Connecting arms 171 and 179 is a tie rod 181 on which is rotatably mounted a cam follower 182 engaging cam 173. As cam 173 rotates, the rise and fall of the cam surface will oscillate tie rod 181 which will in turn oscillate arm 169 through arm 171 and shaft 129. Furthermore, arm 179 will be oscillated which in turn will oscillate shaft 178. Arm 169 will move pusher 157 reciprocally in bracket 166 so that a row of sandwiches will be transferred from, for example, flight row 175 to flight row 180. It should be noted that the space between the flight rows is less than half the width of an ice cream sandwich so that there will be no danger of the sandwiches falling down between the flight rows.

Mounted to oscillate with shaft 178 is an arm 183 having at its distal end a slot 184. Slot 184 engages a pin 186 in a block 187 which is pivotally attached to a slide block 188 by means of a pin 189 pressed into slide block 188. The pusher 158 is attached to the block 187. The slide block 188 is slidably mounted in bracket 191. Two stop pins 190 and 192 project from the outer face of slide block 188. Parts 183 through 192 have a corresponding set of parts at the opposite end of shaft 176. Pin 189 projects slidably into a shaft 193 having a shoulder 194. A spring 196, around shaft 193 and between one slide block 188 and shoulder 194, exerts pressure between the slide blocks 188 and the bracket 191, thereby creating a frictional resistance between these parts. As tie rod 181 oscillates as heretofore described, the arm 183 will be oscillated through rocker arm 179 and shaft 178. As arm 183 rotates in a counterclockwise direction as viewed in Figure 6, the block 187, having its pin 186 engaged in slot 184, and slide block 188 being frictionally restrained as described above, will rotate counterclockwise until the pusher 158 is in the dotted position as shown at 158'. At this time, block 187 will contact pin 192 and the pusher 158 will be moved horizontally to transfer a row of sandwiches from plate 12 to one row of the descending flights. Arm 183 will then reverse its direction and move in a clockwise direction. Once again, with slide block 188 being frictionally restrained, arm 187 will also rotate in a clockwise direction as viewed in Figure 6, thereby raising pusher 158 to clear the next group of sandwiches entering the freezing section of conveyor 11. Block 187 will then contact pin 190, stopping the rotation of block 187, and the pusher 158 will move to the right to the full line position shown in Figure 6.

Pusher 159, which transfers sandwiches from the ascending flights to conveyor 163, is fixed to a slide block 197 which is slidably mounted in bracket 198. Projecting from slide block 197 is a pin 199 which engages in a slot 201 in a rocker arm 202. Arm 202 is fastened to shaft 177 and carries a cam follower 203 which rides on cam 174. A spring 204 urges arm 202 in a counterclockwise direction (Figure 6) so that cam follower 203 will be held against the cam 174. As the cam 174 rotates with shaft 137, rocker arm 202 will oscillate and, being engaged with pin 199 of slide block 197, will move pusher 159 horizontally to transfer successive groups of sandwiches from the ascending rows of flights to conveyor 163. The sandwiches are then carried to the wrapping and cartoning station as herein before described.

The entire freezing assembly is enclosed in a suitable cooling chamber which is not shown in the drawings. Of course, the temperature maintained and the time the product remains in the freezer can be controlled as required to meet the particular circumstances.

The foregoing description of a specific embodiment is for the purpose of compliance with 35 U. S. C. 112, and we do not desire to be limited to the exact details shown and described, for obvious modifications will occur to a person skilled in the art.

I claim:

1. A device for making ice cream sandwiches comprising: a conveyor, power means connected to said conveyor to move products on the conveyor in a given direction; a first means to deposit a cookie at a point on said conveyor; an extrusion nozzle for ice cream positioned above said conveyor at a location spaced from said point in said given direction; means to adjust the rate of flow of ice cream through said nozzle; means connected to said nozzle to allow ice cream to flow therefrom onto a cookie only as said cookie moves past said nozzle; a second means to deposit a second cookie on said ice cream to form a sandwich, said second means including a magazine for cookies adjacent the conveyor, a cookie receiving means adjacent said magazine and directly above said conveyor, means to transfer single cookies from said magazine to said receiving means, and means to apply pressure to the upper surface of said cookie in said receiving means to thereby release same from said receiving means and firmly press said cookie onto the ice cream.

2. The device of claim 1 wherein the means connected to said nozzle to allow ice cream to flow therefrom onto a cookie only as said cookie moves past said nozzle comprises: a gate at the mouth of said nozzle; a solenoid connected to said gate; and a means positioned along said conveyor associated with said solenoid to cause said gate to open and allow ice cream to flow when the front of the cookie starts to pass beneath said nozzle and to close the gate as the rear of said cookie moves beneath said nozzle, said last-mentioned means being positioned to sense the presence of a preceding cookie on said conveyor.

3. A cookie positioning and tamping device for placing a second cookie on a partially completed ice cream sandwich comprising: a magazine for holding a plurality of cookies; a cookie receiving means adjacent said magazine, said receiving means including a pair of pivotable jaws engageable with opposite edges of a cookie; means to transfer a cookie from said magazine to between said jaws; and reciprocable means movable against the upper surface of a cookie, when positioned between said jaws, to cause said cookie to be released therefrom and firmly press said cookie onto a partially completed ice cream sandwich when located beneath said jaws.

4. In a machine for making ice cream sandwiches the improvement in apparatus for depositing ice cream on a sandwich cookie, said improvement comprising: an endless conveyor movable in a given direction; cookie engaging means spaced at given distances on said conveyor for positively positioning and advancing a cookie thereon; a supply of flowable ice cream; a conduit for delivering said ice cream to a location above said conveyor; control means for adjusting the rate of flow of the ice cream through said conduit; a gate in said conduit at said location for interrupting said flow of ice cream therefrom; actuating means connected for opening and closing said gate; and cookie sensing means adjacent said conveyor spaced a multiple of said given distance beyond said location in said given direction for detecting the presence of a preceding cookie on said conveyor, said sensing means being connected to said actuating means whereby said gate will be opened to allow ice cream to flow upon a cookie only as said preceding cookie passes said sensing means.

References Cited in the file of this patent

UNITED STATES PATENTS

| | | |
|---|---|---|
| 259,542 | Holmes | June 13, 1882 |
| 1,568,898 | McNair | Jan. 5, 1926 |
| 1,667,692 | Salerno | Apr. 24, 1928 |
| 1,786,387 | Battista | Dec. 23, 1930 |
| 2,062,277 | Routh | Nov. 24, 1936 |
| 2,347,162 | Watts | Apr. 18, 1944 |
| 2,394,795 | Manspeaker | Feb. 12, 1946 |
| 2,442,146 | Reagin | May 25, 1948 |
| 2,520,493 | Curlee | Aug. 29, 1950 |
| 2,521,213 | Gentry | Sept. 5, 1950 |
| 2,611,327 | Rudolph | Sept. 23, 1952 |
| 2,629,342 | Keyer et al. | Feb. 24, 1953 |
| 2,639,677 | Anderson | May 26, 1953 |
| 2,677,943 | Nelson et al. | May 11, 1954 |